US006863034B2

(12) United States Patent
Kern et al.

(10) Patent No.: US 6,863,034 B2
(45) Date of Patent: Mar. 8, 2005

(54) METHOD OF CONTROLLING A BI-FUEL GENERATOR SET

(76) Inventors: Robert D. Kern, W305 S4273 Brookhill Rd., Waukesha, WI (US) 53188; Gerald C. Ruehlow, N69 W35896 Hwy. K, Oconomowoc, WI (US) 53066; Steven J. Wilcox, W323 S1687 Moraine View Dr., Delafield, WI (US) 53018; Francis X. Wedel, 370 S. Ferry Dr., Lake Mills, WI (US) 53551; Graham McLean, 23 Eagle Brow, Lynn Cheshire (GB), WA13 ON4; Phillip Harrison, 47 Nicholson Avenue, MacClesfield Cheshire (GB), SK10 ZBZ; Peter Winnie, W6329 CTH B, Jefferson, WI (US) 53549; Allen Gillette, W197 S7839 Overlook Bay Board #25B, Muskego, WI (US) 53018; Robert Iles, 413 S. Highland St., Wales, WI (US) 43183

( * ) Notice: Subject to any disclaimer, the term of this patent is extended or adjusted under 35 U.S.C. 154(b) by 16 days.

(21) Appl. No.: 10/346,548

(22) Filed: Jan. 17, 2003

(65) Prior Publication Data

US 2004/0139943 A1 Jul. 22, 2004

(51) Int. Cl.$^7$ .............................. F02B 43/08; F02B 3/00
(52) U.S. Cl. .................. 123/3; 123/27 GE; 123/198 D; 123/435; 123/540; 123/563; 60/599
(58) Field of Search ........................ 123/563, 3, 27 GE, 123/41.29, 41.33, 198 D, 198 DB, 435, 526, 540, 541, 575; 60/599

(56) References Cited

U.S. PATENT DOCUMENTS

| 2,544,978 | A | | 3/1951 | Blessing et al. |
| 2,569,002 | A | | 9/1951 | Holloway et al. |
| 2,584,911 | A | * | 2/1952 | Orr, Jr. ...................... 261/18.2 |
| 2,690,167 | A | | 9/1954 | Moulton |
| 3,016,886 | A | * | 1/1962 | Benz et al. ............. 123/27 GE |
| 3,144,857 | A | | 8/1964 | Hesselberg |
| 3,753,424 | A | | 8/1973 | Haidvogel |
| 3,783,681 | A | * | 1/1974 | Hirt et al. .................. 73/119 R |

(List continued on next page.)

FOREIGN PATENT DOCUMENTS

JP     02294544 A  * 12/1990  .......... F02M/21/02

*Primary Examiner*—Noah P. Kamen
(74) *Attorney, Agent, or Firm*—Boyle Fredrickson Newholm Stein & Gratz S.C.

(57) ABSTRACT

A method is provided for controlling a bi-fuel generator set. The generator set includes a controller, a generator for generating electrical power, and an engine for driving the generator. A flow of gaseous fuel is provided, and operation of the engine and the generator is monitored. The flow of gaseous fuel is adjusted in response to various predetermined operating conditions on the engine. In addition, the flow of gaseous fuel may be selectively passed through a charge cooler remote from a radiator for the engine. The flow of gaseous fuel may be cooled by the charge cooler in response to certain operating conditions on the engine.

30 Claims, 4 Drawing Sheets

U.S. PATENT DOCUMENTS

| | | | |
|---|---|---|---|
| 4,091,772 A | 5/1978 | Heater et al. | |
| 4,106,470 A | * 8/1978 | San Sebastian Saizar | ................ 123/198 DB |
| 4,416,244 A | 11/1983 | McDonald | |
| 4,458,647 A | * 7/1984 | Kruger | ...................... 123/435 |
| 4,463,734 A | 8/1984 | Akeroyd | |
| 4,517,928 A | 5/1985 | Wolters | |
| 4,526,140 A | * 7/1985 | Monigold et al. | ....... 123/41.15 |
| 4,527,516 A | 7/1985 | Foster | |
| 4,570,605 A | 2/1986 | Eberhardt | |
| 4,576,137 A | 3/1986 | Tanaka | |
| 4,597,364 A | 7/1986 | Young | |
| 4,603,674 A | 8/1986 | Tanaka | |
| 4,606,322 A | 8/1986 | Reid et al. | |
| 4,619,240 A | 10/1986 | Bedford et al. | |
| 4,637,353 A | 1/1987 | Codrington | |
| 4,641,625 A | 2/1987 | Smith | |
| 4,677,944 A | 7/1987 | Nishimura et al. | |
| 4,708,094 A | 11/1987 | Helmich et al. | |
| 4,742,801 A | 5/1988 | Kelgard | |
| 4,754,733 A | 7/1988 | Steiger | |
| 4,817,568 A | 4/1989 | Bedford | |
| 4,829,956 A | * 5/1989 | Rehn et al. | ........... 123/198 DB |
| 4,831,993 A | 5/1989 | Kelgard | |
| 4,846,126 A | 7/1989 | Stannard | |
| 4,865,001 A | 9/1989 | Jensen | |
| 4,876,988 A | 10/1989 | Paul et al. | |
| 4,909,209 A | 3/1990 | Takahasi | |
| 4,955,326 A | 9/1990 | Helmich | |
| 4,993,389 A | * 2/1991 | Ahlborn et al. | ............. 123/436 |
| 5,060,618 A | * 10/1991 | Takaoka et al. | ............. 123/436 |
| 5,062,399 A | * 11/1991 | Nagakura et al. | ....... 123/198 D |
| 5,092,305 A | 3/1992 | King | |
| 5,117,801 A | 6/1992 | Schaub et al. | |
| 5,136,986 A | 8/1992 | Jensen | |
| 5,163,397 A | 11/1992 | Pien | |
| 5,224,457 A | 7/1993 | Arsenault et al. | |
| 5,243,932 A | 9/1993 | Herrmann | |
| 5,305,206 A | 4/1994 | Inoue et al. | |
| 5,329,908 A | 7/1994 | Tarr et al. | |
| 5,355,854 A | 10/1994 | Aubee | |
| 5,365,902 A | 11/1994 | Hsu | |
| 5,370,097 A | 12/1994 | Davis | |
| 5,398,724 A | 3/1995 | Vars et al. | |
| 5,423,303 A | * 6/1995 | Bennett | ...................... 123/527 |
| 5,526,645 A | * 6/1996 | Kaiser | ....................... 123/564 |
| 5,526,786 A | 6/1996 | Beck et al. | |
| 5,584,467 A | * 12/1996 | Harnett et al. | ......... 251/129.07 |
| 5,711,270 A | 1/1998 | Pedersen | |
| 5,868,121 A | 2/1999 | Brown et al. | |
| 5,890,459 A | 4/1999 | Hedrick et al. | |
| 5,937,800 A | 8/1999 | Brown et al. | |
| 5,975,050 A | 11/1999 | Brown et al. | |
| 6,003,478 A | * 12/1999 | Huber | ................... 123/27 GE |
| 6,032,617 A | 3/2000 | Willi et al. | |
| 6,073,619 A | * 6/2000 | Baranowski | ................ 123/681 |
| 6,095,112 A | 8/2000 | Glauber et al. | |
| 6,098,576 A | * 8/2000 | Nowak et al. | ........... 123/41.33 |
| 6,101,986 A | 8/2000 | Brown et al. | |
| 6,178,927 B1 | 1/2001 | Rieck et al. | |
| 6,202,601 B1 | 3/2001 | Ouellette et al. | |
| 6,205,957 B1 | 3/2001 | Saylor | |
| 6,230,683 B1 | 5/2001 | zur Loye et al. | |
| 6,250,260 B1 | 6/2001 | Green | |
| 6,363,721 B1 | * 4/2002 | Prenninger et al. | ........... 60/611 |
| 6,752,125 B2 | * 6/2004 | Bruch et al. | ................. 123/399 |

* cited by examiner

METHOD OF CONTROLLING A BI-FUEL GENERATOR SET

FIELD OF THE INVENTION

This invention relates generally to engine driven electrical generator sets, and in particular, to a method of controlling and regulating operation of a bi-fuel, engine-driven electrical generator set.

BACKGROUND AND SUMMARY OF THE INVENTION

Engine-driven, electrical generators are used in a wide variety of applications. Typically, an electrical generator utilizes a single driving engine directly coupled to a generator or alternator through a common shaft. The engine is also directly connected to a pressurized fuel source, such as diesel and/or natural gas, in order that the generator may be automatically activated in the event of a power outage. Upon activation of the generator, a fuel and air mixture is provided to the combustion chambers of corresponding cylinders of the engine. The fuel mixture in each combustion chamber is ignited causing an explosion within the cylinders. The explosive forces within the combustion chambers in the cylinders cause linear motion of the pistons within their corresponding cylinders. The linear motion of the pistons is converted into rotational motion by a crankshaft that, in turn, drives the alternator. As is conventional, the driven alternator generates electrical power.

In order to increase the operating efficiency of the generator, it is contemplated to utilize a diesel engine to drive the alternator. As is known, diesel engines may be operated utilizing both diesel fuel and natural gas as the fuel sources. These "bi-fuel" engines operate on diesel fuel for a first predetermined portion of the operating range of the engine and on a mixture of diesel and gaseous fuels for the remaining portion of the operating range. In order to insure proper operation of the engine, it is necessary to continually monitor the volume of gaseous fuel supplied to the engine. If too much gaseous fuel is provided, the engine may lose power or be damaged. On the other hand, if too little gaseous fuel is provided, the engine will operate at a less than optimum efficiency or emissions performance.

In order to regulate the flow of fuels to the engine, control systems of different types have been developed. By way of example, Rieck, U.S. Pat. No. 6,178,927 discloses a gas engine having a control system with a pilot control device for adjusting the operating state of the engine in response to changes in various monitored limiting conditions. A plurality of predetermined limiting conditions are defined such that the control system stops the engine if the operating point of the engine reaches any of the plurality of limiting conditions. In certain applications wherein the load conditions on a generator varies greatly, the operating point of the engine may approach the limiting conditions thereby resulting in the control system stopping the engine. As such, it is highly desirable to provide a more adaptable control system for the generator that adjusts to continually varying load conditions.

Therefore, it is a primary object and feature of the present invention to provide a method of controlling and regulating operation of a bi-fuel, engine-driven electrical generator set that maintains the engine within desired operating conditions.

It is a further object and feature of the present invention to provide a method of controlling and regulating operation of a bi-fuel, engine-driven electrical generator set that minimizes the emissions produced during operation of the engine.

It is a still further object and feature of the present invention to provide a method of controlling and regulating operation of a bi-fuel, engine-driven electrical generator set that is simple and inexpensive to implement.

In accordance with the present invention, a method is provided for controlling a bi-fuel generator set. The bi-fuel generator set includes a controller, a generator for generating logical power, and an engine for driving the generator. The method includes the steps of providing a flow of gaseous fuel to the engine and monitoring vibration of the engine during operation. A vibration signal is provided to the controller in response to vibration of the engine during operation. The vibration signal is compared to the first threshold such that if the vibration signal exceeds the first threshold, the controller reduces the flow of gaseous fuel provided to the engine.

The air temperature at the air intake of the engine is monitored and compared to a threshold. If the air temperature at the air intake of the engine exceeds the threshold, the controller reduces the flow of gaseous fuel provided to the engine. In addition, the electrical power produced by the generator is monitored. If the electrical power exceeds a threshold, the flow of gaseous fuel provided to the engine is cooled.

The method also includes providing coolant for cooling the engine. The temperature of the coolant is monitored such that if the temperature of the coolant exceeds the threshold, the flow of gaseous fuel provided to the engine is cooled. Diesel fuel is also provided to the engine. The volume of the diesel fuel provided to the engine is adjusted in response to the flow of gaseous fuel provided.

It is contemplated to compare the vibration signal to a second threshold such that if the vibration signal exceeds the second threshold, the controller terminates the flow of gaseous fuel to the engine. In addition, it is contemplated to determine maximum flow of gaseous fuel to the engine in response to a load on the engine and the air temperature of the air intake of the engine. The flow of gaseous fuel provided to the engine is then compared with the maximum flow of gaseous fuel. The flow of gaseous fuel provided to the engine is increased if the flow of gaseous fuel provided to the engine is less than the maximum flow of gaseous fuel. Further, if the vibration signal is less than the first threshold, the flow of gaseous fuel to the engine is also increased.

If the temperature of the coolant exceeds a first threshold, the flow of gaseous fuel to the engine is stopped. If the temperature of the coolant exceeds a second threshold, the engine is stopped.

In accordance with a further aspect of the present invention, a method is provided for controlling a bi-fuel generator set having a control, a generator for generating electrical power, and an engine for driving the generator. The method includes the steps of providing a flow of gaseous fuel to the engine and cooling the flow of gaseous fuel. The flow of gaseous fuel provided to the engine may be cooled if the electrical power exceeds a threshold and/or the temperature of the coolant of the engine exceeds a threshold.

The vibration of the engine during operation is monitored and a vibration signal is provided to the controller in response thereto. The vibration signal is compared to a threshold such that if the vibration signal exceeds the threshold, the controller reduces the flow of gaseous fuel provided to the engine. If the vibration signal is less than the threshold, the flow of gaseous fuel provided to the engine is increased. In addition, the vibration signal may be compared to a second threshold such that if the vibration signal exceeds the second threshold, the controller terminates the flow of gaseous fuel to the engine.

The method includes the steps of monitoring the air temperature at the air intake of the engine and adjusting the flow of gaseous fuel provided to the engine in response to the air temperature at the air intake. The temperature of the coolant for the engine is also monitored. If the temperature of the coolant exceeds a first threshold, the flow of gaseous fuel provided to the engine stops. If the temperature of the coolant exceeds a second threshold, the engine is stopped. The speed of the engine may also be monitored such that if oscillations in the speed of the engine are detected, the flow of gas provided to the engine may be reduced.

In accordance with a still further aspect of the present invention, a method of controlling a bi-fuel generator set is provided. The generator set includes a controller, a generator for generating electrical power, and an engine for driving the generator. The method includes the steps of providing diesel fuel to the cylinders of the engine for ignition and providing a flow of gaseous fuel to the engine. The operating conditions of the engine and the generator are monitored and the flow of gaseous fuel to the engine is adjusted in response to predetermined operating conditions on the engine.

It is contemplated to cool the flow of gaseous fuel provided to the engine under certain conditions. For example, the gaseous fuel provided to the engine may be cooled if the temperature of the coolant of the engine exceeds a threshold. Alternatively, the gaseous fuel provided to the engine may be cooled if the electrical power generated by the generator exceeds a threshold.

The step of monitoring the operating conditions of the engine may include the step of monitoring vibration of the engine during operation. Thereafter, a vibration signal may be provided to the controller in response to vibrations. The vibration signal is compared to a first threshold such that if the vibration signal exceeds the first threshold, the flow of gaseous fuel provided to the engine is reduced. If the vibration signal is less than the first threshold, the flow of gaseous fuel to the engine is increased. If the vibration signal is greater than a second threshold, the flow of gaseous fuel provided to the engine is terminated.

The air temperature at the air intake of the engine, the temperature of the coolant for the engine, and the speed of the engine may also be monitored. If the temperature of the coolant exceeds a first threshold, the flow of gaseous fuel to the engine is stopped. If the temperature of the coolant exceeds a second threshold, the engine is stopped. If oscillations are detected in the speed of the engine, the flow of gaseous fuel provided to the engine is reduced.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
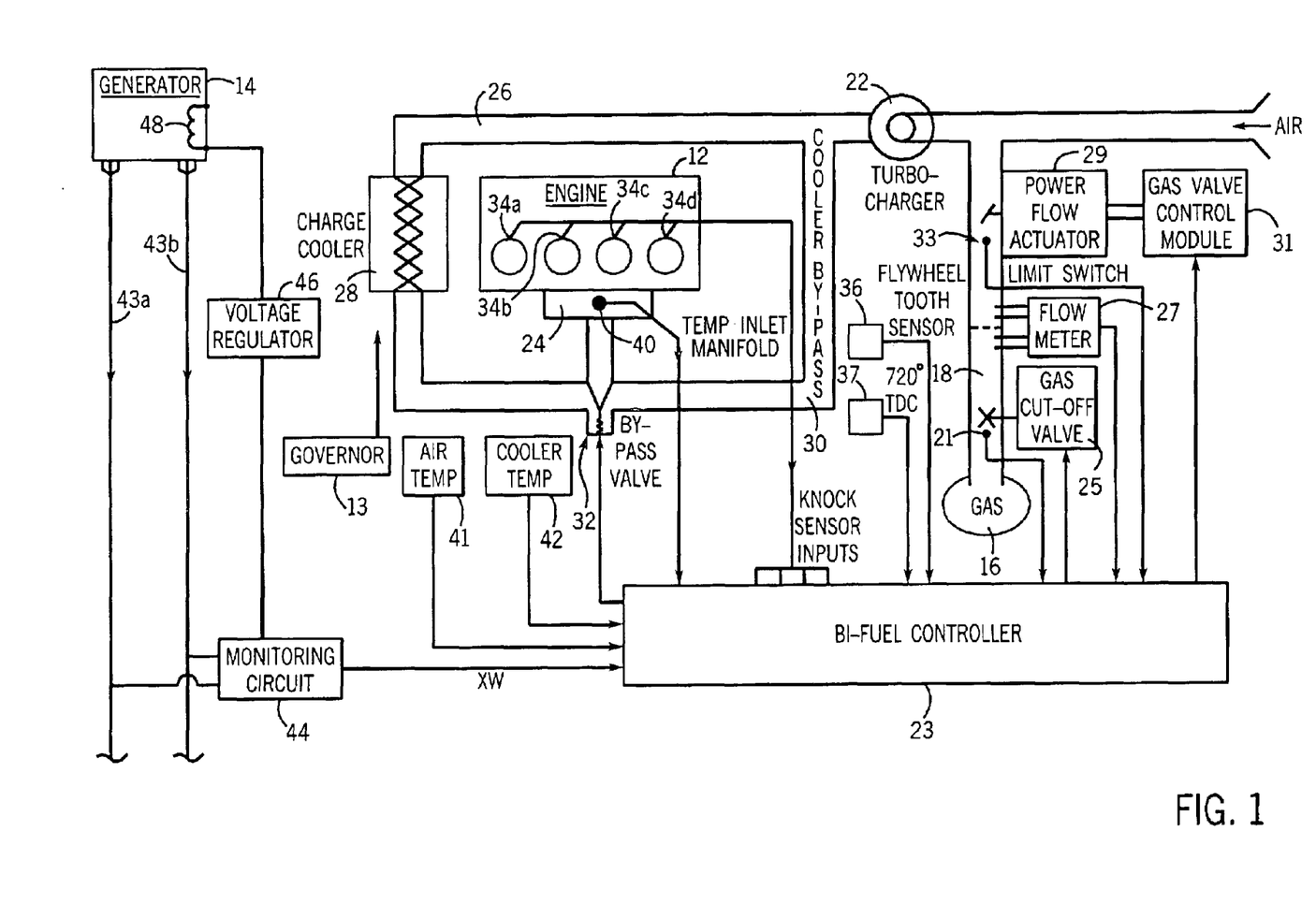
FIG. 1 is a schematic view of an engine driven electrical generator set controlled in accordance with the method of the present invention.
Figure 4:
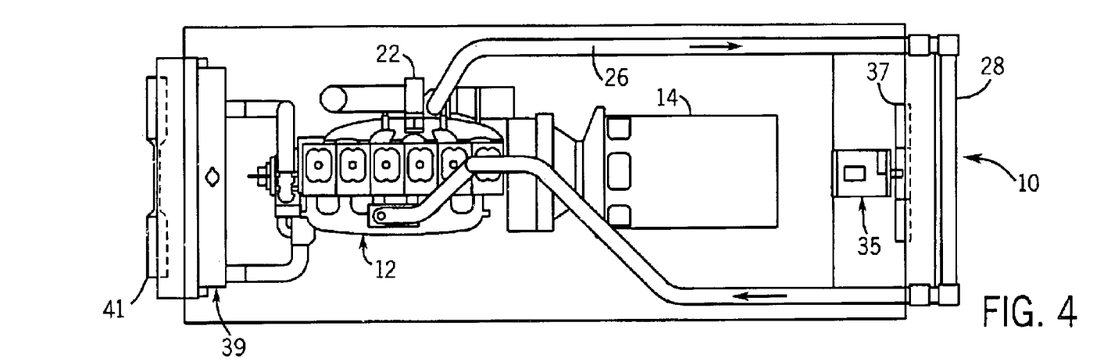
FIG. 4 is a schematic, top plan view of an engine driven electrical generator set.
Figure 5:
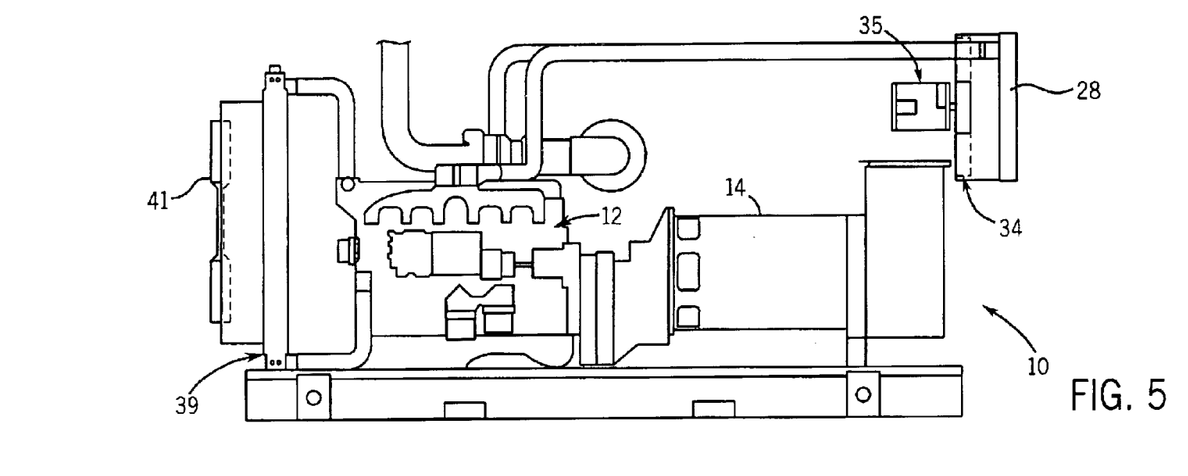
FIG. 5 is a schematic, side elevational view of an engine driven electrical generator set.

Referring to FIGS. 1 and 4–5, a generator set in accordance with the present invention is generally designated by the reference numeral 10. Generator set 10 includes an engine 12 operatively connected to generator 14 in a conventional manner. It is contemplated that engine 12 take the form of a conventional engine that is capable of operating in either a full diesel mode wherein diesel fuel only is supplied to engine 12 or a bi-fuel mode wherein a fuel mixture of natural gas and diesel fuel is provided to engine 12.

As is conventional, engine 12 includes pistons that are slidably received within corresponding cylinders thereof. In full diesel mode, diesel fuel is provided to the cylinders of engine 12 and ignited so as to generate reciprocal movement of the pistons. The flow of diesel fuel to the cylinders of engine 12 is controlled by governor 13, in a conventional manner. The reciprocal movement of the pistons of engine 12 is translated to rotational movement by a crankshaft that, in turn, drives generator 14. In order to increase the efficiency of engine 12 and reduce the emissions, it is contemplated to operate engine 12 in the bi-fuel mode wherein a mixture of natural gas and air is forced into the cylinders of engine 12. As hereinafter described, the natural gas contribution to the fuel mixture will vary between 0 percent and approximately 90 percent of the total fuel provided to engine 12.

As best seen in FIG. 1, a supply of natural gas is generally designated by the reference numeral 16. First flow path 18 has an input communicating with natural gas supply 18 and an output communicating with air flow path 19. Air flow path 19 has an input communicating with an air source, (such as ambient air) and an output communicating with the input of turbo charger 22. First flow path 18 includes limit switch 21 operatively connected to bi-fuel controller 23 and gas cut off valve 25. Gas cut off valve 25 opens and closes the first flow path 18 in response to instructions received from bi-fuel controller 23. In addition, first flow path 18 includes flow meter 27 for measuring the gas flow therethrough and throttle-body actuator 29 for controlling the volume of natural gas provided to air flow path 19. Throttle-body actuator 29 is operatively connected to control module 31 that is connected, in turn, to bi-fuel controller 23. Limit switch 33 is provided in first flow path 18 and provides a signal corresponding to the flow rate of the natural gas to air flow path. 19 to bi-fuel controller 23, for reasons hereinafter described.

The output of turbo charger 22 is operatively connected to the input of engine manifold 24 through first and second paths 26 and 30, respectively. In response to instructions from bi-fuel controller 23, bypass valve 32 controls the path (either first path 26 or second path 30) of the fuel mixture outputted by turbo charger 22, for reasons hereinafter described. Bypass valve 32 is movable between a first, non-bypass position wherein the fuel mixture travels along first path 26 to engine manifold 24 and a bypass position wherein the fuel mixture travels along second path 30 to engine manifold 24. First path 26 includes charge cooler 28 for allowing the fuel mixture to flow therethrough. Upon activation, fan drive motor 35 rotates cooling fan 37 to draw ambient air through charge cooler 28 so as to cool the fuel mixture flowing therethrough. As is known, a cooler fuel mixture is less sensitive to detonation. As such, a higher percentage of the total fuel supplied to engine 14 for a given load may be the fuel mixture, as opposed to the diesel fuel. A higher percentage of the fuel mixture in the total fuel supplied to engine 14 increases the efficiency of engine 14 and reduces the emissions generated by engine 14 during operation. In addition, since gaseous fuel is less expensive than diesel fuel, operating at a higher ratio of the fuel mixture to diesel fuel decreases the overall cost of operating engine 14.

Referring to FIGS. 4 and 5, generator set 10 also includes radiator 39 operatively connect to engine 12 to receive coolant therefrom. As is conventional, cooling fan 41 draws ambient air through radiator 39 to effectuate a heat exchange with the coolant received from engine 12. The coolant exits radiator 39 and returns to engine 12 to cool the same. It is contemplated to position charge cooler 28 at an opposite end of generator set 10 from radiator 39 and engine 12 in order to insure that the ambient air drawn through charge cooler 28 is of a minimum temperature thereby maximizing the cooling effect on the fuel mixture flowing therethrough.

As best seen in FIG. 1, generator set 10 further includes manifold temperature sensor 40 operatively connected to the engine manifold 24 to monitor and measure the temperature of the fuel mixture supplied to the engine manifold 24 of engine 12 and to provide a manifold temperature signal to bi-fuel controller 23. In addition, air temperature sensor 41 is provided to measure the temperature of the ambient air adjacent engine 12 and a cooling medium temperature sensor 42 is provided for measuring the temperature of the cooling medium or coolant used to cool engine 12. Air temperature sensor 41 and cooling medium temperature sensor 42 provide corresponding temperature signals to bi-fuel controller 23. It is contemplated that readings of air temperature sensor 41 be used by bi-fuel controller 23 to adjust the flow of air/fuel mixture to engine manifold 24 of engine 12 based on the calorific content of the fuel that can change with temperature.

Generator set 10 further includes a plurality of knock sensors 34a–d operatively connected to engine 12 and flywheel sensor 36. Knock sensors 34a–d may take the form of accelerometers attached to engine 12 to provide feedback signals to bi-fuel controller 23. It is intended that knock sensors 34a–d detect high frequency oscillations of pressure in the cylinders of engine 12 that can lead to mechanical breakdown of engine 12. By way of example, knock sensors 34a–d are connected to engine 12 adjacent corresponding cylinders. For each cylinder firing, the closest knock sensor 34a–d is monitored over a specific time interval during which the output signals of knock sensors 34a–d are integrated. Bi-fuel controller 23 samples these integrals and compares the samples to a series of thresholds. Thereafter, bi-fuel controller 23 counts the number of samples above each threshold during a specific time period (hereinafter referred to as "the number of knocks"). As hereinafter described, bi-fuel controller 23 adjusts the flow of gas to turbo charger 22 in response to the number of knocks detected during a specific time period.

Flywheel sensor 36 detects each tooth of the flywheel of engine 12 as the tooth passes a fixed point on the enclosure of the flywheel and provides a signal to bi-fuel controller 23 in response thereto. Sensor 37 is mechanically set to send a signal to bi-fuel controller 23 on the compression stroke of one of the cylinders of engine 12. From such information, bi-fuel controller 23 calculates the speed of engine 12 and the engine firing sequence. This, in turn, allows bi-fuel controller 23 to detect engine speed oscillations such that if the engine speed begins to oscillate above a predetermined threshold, bi-fuel controller 23 will reduce the flow of gas provided to turbo charger 22. In addition, this information provides bi-fuel controller 23 with a time frame for monitoring knock sensors 34a–d for any unusual combustion noises.

As is conventional, generator 14 generates AC voltage having a magnitude and a frequency and an AC current having a magnitude and a frequency on lines 43a and 43b. The output of generator 14 is monitored by monitoring structure 44 that, in turn, calculates the AC power generated by generator 14 according to the expression:

$$P = I \times V \times pf \qquad \text{Equation (1)}$$

wherein: P is the AC power, I is root means square of the AC current, V is the root means square of the AC voltage, and pf is the power factor (or the cosine of the angular displacement between the voltage and the current). The output power is calculated by monitoring circuit 44 and provided to bi-fuel controller 23, for reasons hereinafter described.

As is conventional, generator 14 includes an armature winding or exciter 48 that controls the magnitude of the AC output voltage of generator 14. Voltage regulator 46 acts to increase or decrease the excitation of exciter 48 of generator 14 to the degree needed to maintain the magnitude of the AC output voltage at a desired value. During operation of generator set 10, monitoring circuit 44 advises voltage regulator 46 of the desired magnitude of the AC voltage and voltage regulator 46 raises or lowers the magnitude of the AC voltage provided by generator 14.

Figure 2:
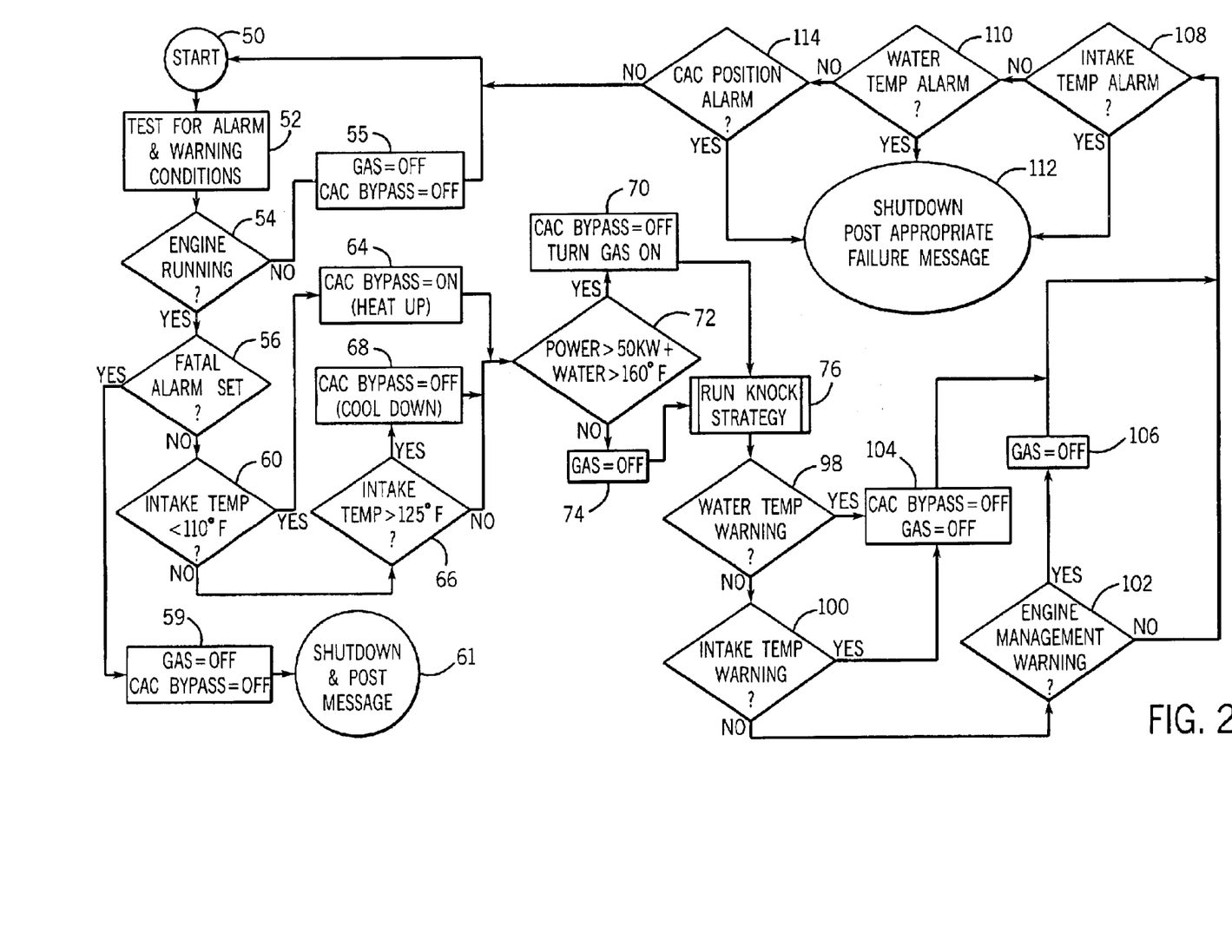
FIG. 2 is a flow chart of a portion of the control methodology of the present invention.

Referring to FIG. 2, in operation, bi-fuel controller 23 is initialized, block 50, upon activation of generator set 10. Bi-fuel controller 23 scans the various sensors heretofore described to determine if any alarm or warning conditions are present on engine 12, block 52. In addition, bi-fuel controller 23 determines if engine 12 is running, block 54. If engine 12 is not running, bi-fuel controller 23 confirms that gas cut-off valve 25 is closed and that bypass valve 32 is in the non-bypass position, and initializes the various sensors of generator set 10, block 55.

As engine 12 is started, a vacuum is generated in the cylinders of engine 12 causing governor 13 to open the throttle of engine 12 and allow for the flow of diesel fuel to the cylinders of engine 12. As is conventional, the diesel fuel is ignited so as to cause the reciprocal movement of pistons contained in the cylinders of engine 12. Thereafter, governor 13 controls the flow of diesel fuel to the cylinders of engine 12 such that engine 12 operates at a desired engine speed. Once it is determined that engine 12 is running, block 56, bi-fuel controller 23 continually monitors the various sensors for generator set 10, as heretofore described, block 58, to determine if a fatal alarm condition is present on engine 12. By way of example, a fatal alarm condition may include, but is not limited to, extreme engine temperature, a lack of oil pressure or the like. If a fatal alarm condition is detected, gas cut-off valve 25 is closed, block 59, and operation of engine 12 is terminated, block 61. A message may be provided to a user to indicate that a fatal alarm condition is present and that engine 12 has been shutdown.

If a fatal alarm condition is not detected, bi-fuel controller 23 monitors the temperature of temperature sensor 40 within the engine manifold 24, block 60. If the temperature within engine manifold 24 is less than a prescribed temperature (e.g., 110 degrees Fahrenheit), bi-fuel controller 23 moves bypass valve 32 to the bypass position such that the output of turbo charger 22 travels along second path 30 and bypasses charge cooler 28, block 64. If the temperature within the manifold is greater than 110 degrees Fahrenheit, bi-fuel controller 23 determines if the temperature within engine manifold 24 is greater than a prescribed temperature (e.g., 125 degrees Fahrenheit), block 66. If the temperature within engine manifold 24 is greater than 125 degrees Fahrenheit, bypass valve 32 is moved to the non-bypass position such that the output of turbo charger 22 travels along first path 26 through cooling charger 28, block 68.

In addition to monitoring the temperature of temperature sensor 40 within the engine manifold 24, bi-fuel controller 23 monitors the power outputted by generator 14 (through monitoring circuit 44) and the temperature of the coolant flowing through engine 12, block 72. If the power generated by generator 14 is less than a predetermined value (e.g., 50 kilowatts) and the coolant temperature of engine 12 is less than a predetermined value (e.g. 160 degrees Fahrenheit), bi-fuel controller 23 maintains gas cut-off valve 25 in the closed position such that no gas is supplied to engine 12, block 74. Alternatively, if the power supplied by generator exceeds a predetermined value (e.g., 50 kilowatts) and if the coolant temperature of engine 12 exceeds a predetermined value (e.g. 160 degrees Fahrenheit), bypass valve 32 is moved to the non-bypass position and the gas cutoff valve 25 is open such that gas flows to turbo charger 22, as heretofore described, block 78. Thereafter, bi-fuel controller 23 runs knock strategy, block 76.

Figure 3:
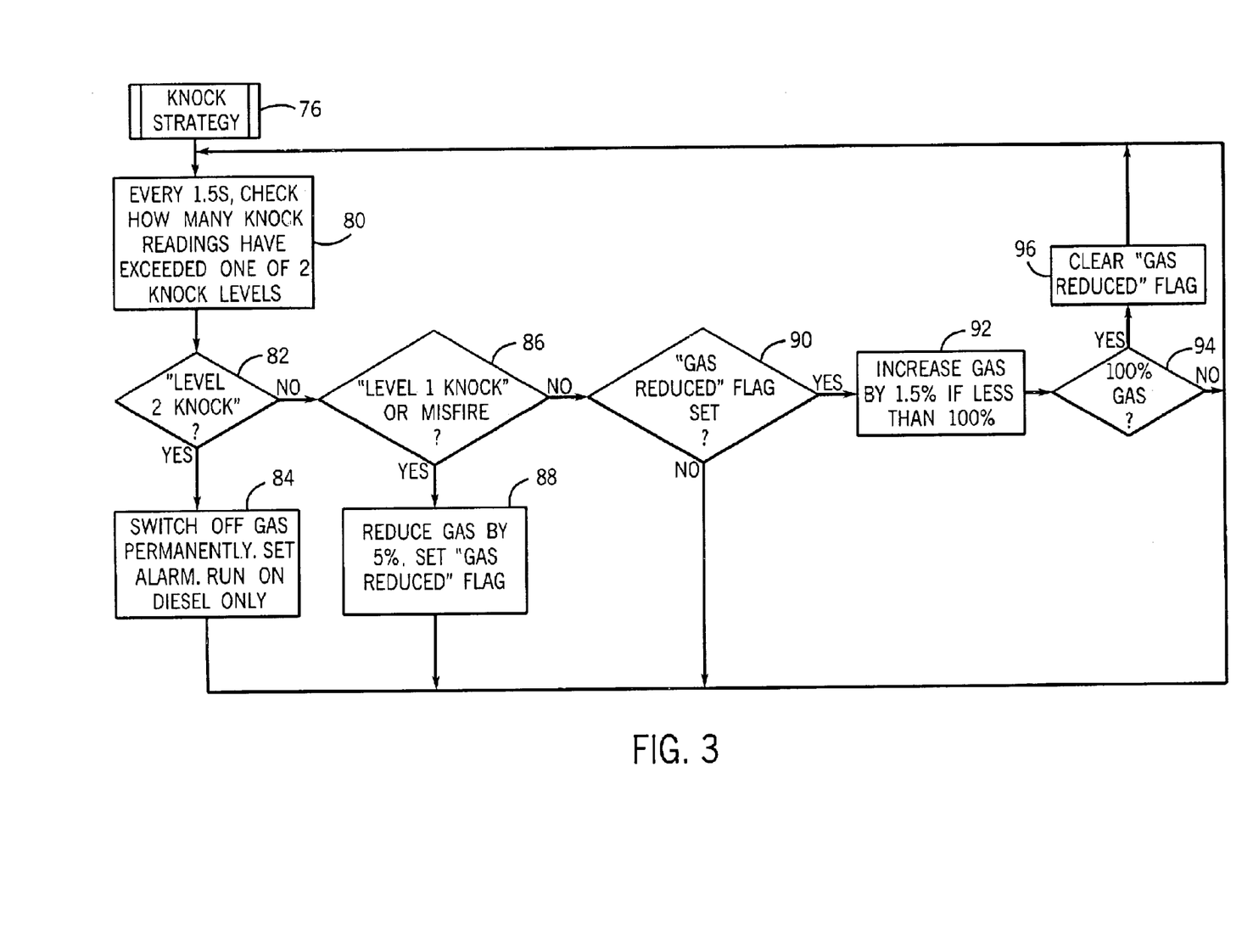
FIG. 3 is a second portion of the control methodology of the present invention.

Referring to FIG. 3, once the knock strategy is started, bi-fuel controller 23 monitors the number of knocks detected by knock sensors 34a–34d over a predetermined period of time. By way of example, bi-fuel controller 23 may check the status of knock sensor 34a–34d every 1.5 seconds, block 80. The number of knocks detected is compared to the first predetermined level, block 82. If the number of knocks exceeds a first predetermined level, gas cutoff valve 25 is closed so as to turn-off the gas supplied to turbo charger 22 such that engine 12 runs entirely on diesel fuel, block 84. In addition, bi-fuel controller 23 advises the user that an alarm condition is present in engine 12. Thereafter, bi-fuel controller 23 returns to the step of detecting knocks, block 80

If the number of knocks detected by knock sensors 34a–34d does not exceed the first predetermined level, the number of knocks detected is compared to a second predetermined level, block 86. If the number of knocks detected exceeds the second predetermined level, throttle-body actuator 29 adjusts the flow of gas supplied to turbo charger 22 of engine 12 by a predetermined amount (e.g. 5%) and a gas reduced flag is set, block 88. Thereafter, bi-fuel controller 23 returns to the step of detecting knocks, block 80

If the number of knocks detected by knock sensors 34a–34d does not exceed either the first or second predetermined levels, bi-fuel controller 23 determines if a gas reduced flag is set, block 90. If bi-fuel controller 23 determines that the gas reduced flag has been set, bi-fuel controller 23 causes throttle-body actuator 29 to open thereby increasing the flow of gas to engine 12 by a predetermined volume (e.g., 1.5%). The volume of gas provided to engine 12 is limited to a predetermined maximum level, block 92, that is calculated by bi-fuel controller 23 in response to the magnitude of the output power generated by generator 14 and the temperature at engine manifold 24. If, after increasing the volume of gas provided to turbo charger 22, the volume of gas provided is less than the predetermined maximum level, block 94, bi-fuel controller 23 returns to the step of detecting knocks, block 80. If, after increasing the volume of gas provided to turbo charger 22, the volume of gas provided is equal to the predetermined maximum level, bi-fuel controller 23 clears the gas reduced flag, block 96, and returns to the step of detecting knocks, block 80.

Returning to FIG. 2, during execution of the knock strategy, block 76, bi-fuel controller 23 continues to monitor the coolant temperature of engine 12, block 98, the air/fuel mixture temperature in engine manifold 24, block 100, and various other conditions on engine 12 such as oil pressure and the like, block 102. If the coolant temperature exceeds a predetermined threshold, bypass valve 32 is moved by bi-fuel controller 23 to the non-bypass position and gas cutoff valve 25 is closed, block 104. Similarly, if the temperature of the fuel mixture at engine manifold 24 exceeds a predetermined threshold, bypass valve 32 is moved by bi-fuel controller 23 to the non-bypass position and gas cutoff valve 25 is closed, block 104. In addition, if any of the other monitored conditions on engine 12 exceed a predetermined threshold, gas cutoff valve 25 is closed, block 106.

If the coolant temperature exceeds a second predetermined threshold, block 110, operation of engine 12 is terminated, block 112. A message may be provided to a user to indicate that a fatal condition is present on generator set 10 and engine 12 has been shutdown. Similarly, if the temperature of the air/fuel mixture in engine manifold 24 exceeds a second predetermined threshold, block 108, operation of engine 12 is terminated, block 112. A message may be provided to a user to indicate that a fatal condition is present on generator set 10 and that engine 12 has been shutdown. Further, if bypass valve 32 is locked in the bypass position, block 114, operation of engine 12 is terminated, block 112. A message may be provided to a user to indicate that a fatal condition is present on generator set 10 and that engine 12 has been shutdown.

Various modes of carrying out the invention are contemplated as being within the scope of the following claims particularly pointing out and distinctly claiming the subject matter which is regarded as the invention.

We claim:

1. A method of controlling a bi-fuel generator set having a controller, a generator for generating electrical power, and an engine for driving the generator, the method comprising the steps of:

providing a flow of gaseous fuel to the engine;

monitoring vibration of the engine during operation and providing a vibration signal to the controller in response thereto;

comparing the vibration signal to a first threshold such that if the vibration signal exceeds the first threshold, the controller reduces the flow of gaseous fuel provided to the engine;

monitoring the electrical power produced by the generator; and cooling the flow of gaseous fuel provided to the engine if the electrical power exceeds a threshold.

2. The method of claim 1 further comprising the steps of:

providing an air intake for the engine and monitoring the air temperature at the air intake of the engine; and comparing the air temperature to a threshold such that if the air temperature exceeds the threshold, the controller reducing the flow of gaseous fuel provided to the engine.

3. The method of claim 1 comprising the additional steps:

providing coolant for cooling the engine;

monitoring the temperature of the coolant; and cooling the flow of gaseous fuel provided to the engine if the temperature of the coolant exceeds a threshold.

4. The method of claim 1 comprising the additional steps of:
    providing diesel fuel to the engine; and
    adjusting the volume of the diesel fuel provided to the engine in response to the flow of gaseous fuel provided to the engine.

5. The method of claim 1 further comprising the steps of:
    providing an air intake for the engine and monitoring the air temperature at the air intake of the engine;
    determining a maximum flow of gaseous fuel to the engine in response to a load on the engine and the air temperature at the air intake of the engine; and
    comparing the flow of gaseous fuel provided to the engine and the maximum flow of gaseous fuel.

6. The method of claim 5 comprising the additional step of increasing the flow of gaseous fuel provided to the engine if the flow of gaseous fuel provided to the engine is less than the maximum flow of gaseous fuel.

7. The method of claim 1 wherein if the vibration signal is less than the first threshold, comprising the additional steps of:
    increasing the flow of gaseous fuel to the engine; and
    returning to the step of monitoring the vibration of the engine during operation.

8. The method of claim 1 comprising the additional steps:
    providing coolant for cooling the engine; and
    monitoring the temperature of the coolant such that if the temperature of the coolant exceeds a first threshold performing the additional step of stopping the flow of gaseous fuel to the engine.

9. The method of claim 8 wherein if the temperature of the coolant exceeds a second threshold performing the additional step of stopping the engine.

10. The method of claim 1 comprising the additional steps of:
    monitoring the speed of the engine; and
    reducing the flow of gaseous fuel in response to oscillations in the speed of engine.

11. A method of controlling a bi-fuel generator set having a controller, a generator for generating electrical power, and an engine for driving the generator, the method comprising the steps of:
    providing a flow of gaseous fuel and a flow of diesel fuel;
    combining the flow of gaseous fuel and the flow of diesel fuel to form a fuel mixture, the fuel mixture having a ratio of gaseous fuel to diesel fuel;
    providing the fuel mixture to the engine;
    positioning a charge cooler remote from a radiator for the engine;
    selectively passing the flow of gaseous fuel through the charge cooler in response to a predetermined operating parameter in order to cool the gaseous fuel in the fuel mixture; and
    increasing the ratio of cooled gaseous fuel to diesel fuel in the fuel mixture.

12. The method of claim 11 wherein:
    the generator set includes coolant provided for cooling the engine;
    the predetermined parameter is the temperature of the engine coolant; and
    the step of passing the flow of gaseous fuel through the charge cooler includes the additional steps of:
    monitoring the temperature of the coolant; and
    cooling the flow of gaseous fuel if the temperature of the coolant exceeds a threshold.

13. The method of claim 11 comprising the additional steps of:
    monitoring vibration of the engine during operation and providing a vibration signal to the controller in response thereto; and
    comparing the vibration signal to a threshold such that if the vibration signal exceeds the threshold, the controller reduces the flow of gaseous fuel.

14. The method of claim 13 wherein if the vibration signal is less than the threshold, comprising the additional steps of:
    increasing the flow of gaseous fuel; and
    returning to the step of monitoring the vibration of the engine during operation.

15. The method of claim 13 comprising the additional step of comparing the vibration signal to a second threshold such that if the vibration signal exceeds the second threshold, the controller terminates the flow of gaseous fuel.

16. The method of claim 13 wherein the step of adjusting the flow of fuel includes the additional step of comprising the additional step of comparing the vibration signal to a second threshold such that if the vibration signal exceeds the second threshold, the flow of gaseous fuel is terminated.

17. The method of claim 11 comprising the additional steps of:
    providing an air intake for the engine and monitoring the air temperature at the air intake of the engine; and
    adjusting the flow of gaseous fuel in response to the air temperature at the air intake.

18. The method of claim 11 comprising the additional steps:
    providing coolant for cooling the engine;
    monitoring the temperature of the coolant such that if the temperature of the coolant exceeds a first threshold performing the additional step of stopping the flow of gaseous fuel.

19. The method of claim 18 wherein if the temperature of the coolant exceeds a second threshold performing the additional step of stopping the engine.

20. The method of claim 11 comprising the additional steps of:
    monitoring the speed of the engine; and
    reducing the flow of gaseous fuel in response to oscillations in the speed of engine.

21. A method of controlling a bi-fuel generator set having a controller, a generator for generating electrical power, and an engine for driving the generator, the method comprising the steps of:
    providing diesel fuel to the cylinders of the engine for ignition;
    providing a flow of gaseous fuel to the engine;
    monitoring the operating conditions of the engine and the generator;
    adjusting the flow of gaseous fuel to the engine in response to predetermined operation conditions on the engine;
    monitoring the electrical power produced by the generator; and
    cooling the gaseous fuel provided to the engine if the electrical power exceeds a threshold.

22. The method of claim 21 comprising the additional step of cooling the flow of gaseous fuel provided to the engine.

23. The method of claim 22 wherein the step of cooling the flow of gaseous fuel includes the steps of:

providing coolant for cooling the engine;

monitoring the temperature of the coolant; and cooling the gaseous fuel provided to the engine if the temperature of the coolant exceeds a threshold.

24. The method of claim 21 wherein the step of monitoring the operation conditions of the engine includes the step of monitoring vibration of the engine during operation and providing a vibration signal to the controller in response thereto, and wherein the step of adjusting the flow of gaseous fuel includes the step of comparing the vibration signal to a first threshold such that if the vibration signal exceeds the first threshold, the flow of gaseous fuel provided to the engine is reduced.

25. The method of claim 24 wherein if the vibration signal is less than the first threshold, the step of adjusting the flow of fuel includes the additional steps of:

increasing the flow of gaseous fuel to the engine; and returning to the step of monitoring the vibration of the engine during operation.

26. The method of claim 21 wherein the step of monitoring the operating conditions includes the step of monitoring the air temperature at the air intake of the engine.

27. The method of claim 21 wherein the step of monitoring the operating conditions includes the step of monitoring the temperature of the coolant such that if the temperature of the coolant exceeds a first threshold performing the additional step of stopping the flow of gaseous fuel to the engine.

28. The method of claim 27 wherein if the temperature of the coolant exceeds a second threshold performing the additional step of stopping the engine.

29. The method of claim 21 wherein the step of monitoring the operating conditions includes the step of monitoring the speed of the engine and wherein the step of adjusting the flow of fuel includes the step of reducing the flow of gaseous fuel provided to the engine in response to oscillations in the speed of the engine.

30. A method of controlling a hi-fuel generator set having a controller, a generator for generating electrical power, and an engine for driving the generator, the method comprising the steps of:

providing a flow of gaseous fuel;

positioning a charge cooler remote from a radiator for the engine;

passing the flow of gaseous fuel through the charge cooler to selectively cool the flow of gaseous fuel; and providing the cooled flow of gaseous fuel to the engine;

wherein the step of passing the flow of gaseous fuel through the charge cooler includes the additional steps of:

monitoring the electrical power generated by the generator; and cooling the flow of gaseous fuel if the electrical power exceeds a threshold.

* * * * *